United States Patent [19]

Field et al.

[11] Patent Number: 4,909,220
[45] Date of Patent: Mar. 20, 1990

[54] FUEL INJECTION

[75] Inventors: Martin J. Field, Churchville, N.Y.; Jeffrey S. Calhoun, Everett, Pa.

[73] Assignee: General Motors Corporation, Detroit, Mich.

[21] Appl. No.: 80,831

[22] Filed: Aug. 3, 1987

[51] Int. Cl.$^4$ ............................................. F02M 39/00
[52] U.S. Cl. ..................................... 123/468; 123/458; 123/452
[58] Field of Search ........ 123/468, 469, 470, 452–455, 123/458

[56] References Cited

U.S. PATENT DOCUMENTS

| 2,913,231 | 11/1959 | Powell | 123/455 |
|---|---|---|---|
| 3,227,147 | 1/1966 | Gossiaux | 123/468 |
| 3,845,748 | 11/1974 | Eisenberg | 123/469 |
| 3,949,713 | 4/1976 | Rivere | 123/458 |
| 4,474,160 | 10/1984 | Gartner | 123/408 |
| 4,570,598 | 2/1986 | Samson | 123/445 |

FOREIGN PATENT DOCUMENTS

| 0238156 | 9/1987 | European Pat. Off. . |
| 3316979 | 11/1984 | Fed. Rep. of Germany . |
| 3320469 | 12/1984 | Fed. Rep. of Germany . |
| 2551835 | 3/1985 | France . |

Primary Examiner—Carl S. Miller
Attorney, Agent, or Firm—C. K. Veenstra

[57] ABSTRACT

The base of a fuel injector has a plurality of radially opening recesses that receive the ends of injection tubes, the end of each tube is flared and surrounded by an O-ring that seals the tube in its recess, each tube is surrounded by a sleeve that supports the tube in its recess, and a retainer clip is secured over the injector base and has spring fingers that embrace the tubes and bias the sleeves to retain the ends of the tubes in their recesses.

3 Claims, 2 Drawing Sheets

FUEL INJECTION

TECHNICAL FIELD

This invention relates to a fuel injection system for a multi-cylinder internal combustion engine in which a plurality of injection nozzles discharge fuel adjacent the engine inlet ports and a single injector meters the fuel to all of the injection nozzles.

SUMMARY OF THE INVENTION

The fuel injection system disclosed in U.S. patent application Ser. No. 10,296 filed Feb. 2, 1987 in the names of E. R. Stettner and D. D. Stoltman includes a single, or central, injector that meters fuel to a plurality of injection nozzles.

Each of the injection nozzles is connected to the central injector through a slim injection tube. This invention provides a structure which assures that the injection tubes may be readily connected to and retained by the central injector.

In a structure according to this invention, the base of the central injector has a plurality of radially opening recesses that receive the ends of the injection tubes, the end of each tube is flared and surrounded by an O-ring that seals the tube in its recess, each tube is surrounded by a sleeve that supports the tube in its recess, and a retainer clip is secured to the bottom of the injector base and has spring fingers that embrace the tubes and bias the sleeves to retain the ends of the tubes in their recesses.

The details as well as other features and advantages of two embodiments of this invention are set forth in the remainder of the specification and are shown in the accompanying drawings.

SUMMARY OF THE DRAWINGS

In FIG. 2, the line 1A—1A is the section line for the FIG. 1 view of the injector base, and the line 1B—1B is the section line for the FIG. 1 view of an air inlet adapter.

THE PREFERRED EMBODIMENTS

Figure 1:
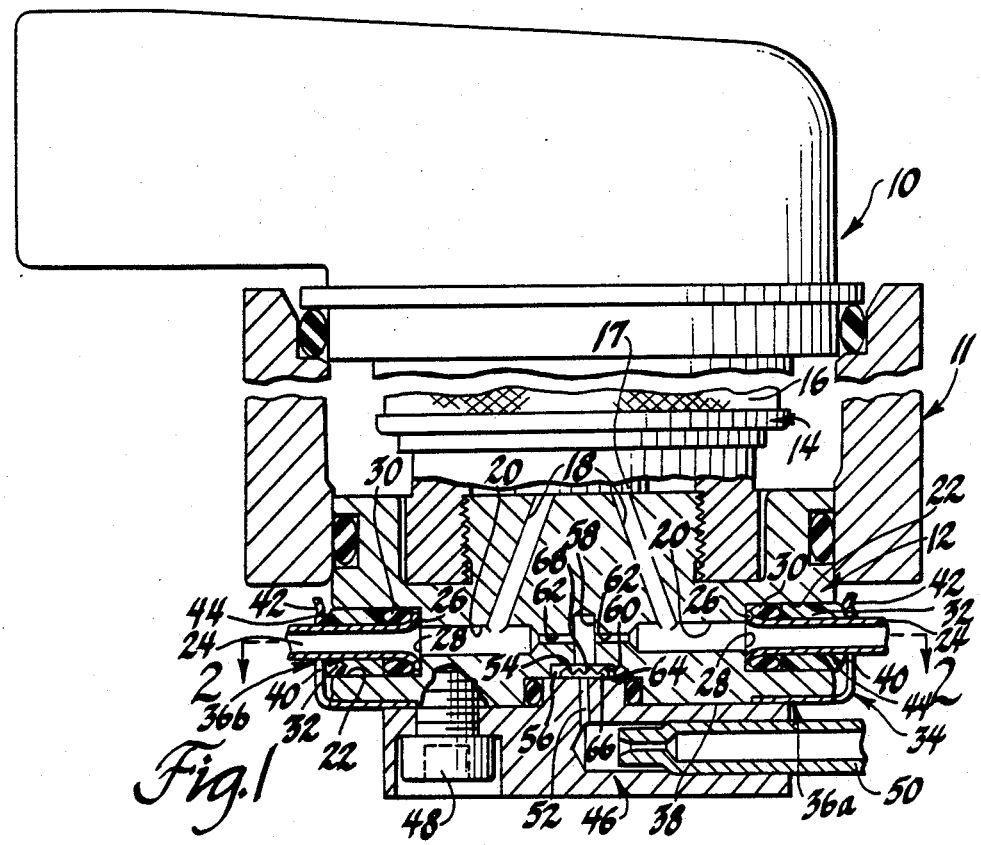
FIG. 1 is a partially sectional view of a fuel injector incorporating one embodiment of this invention and showing the engagement of the retainer clip with the injection tube sleeves.
Figure 2:
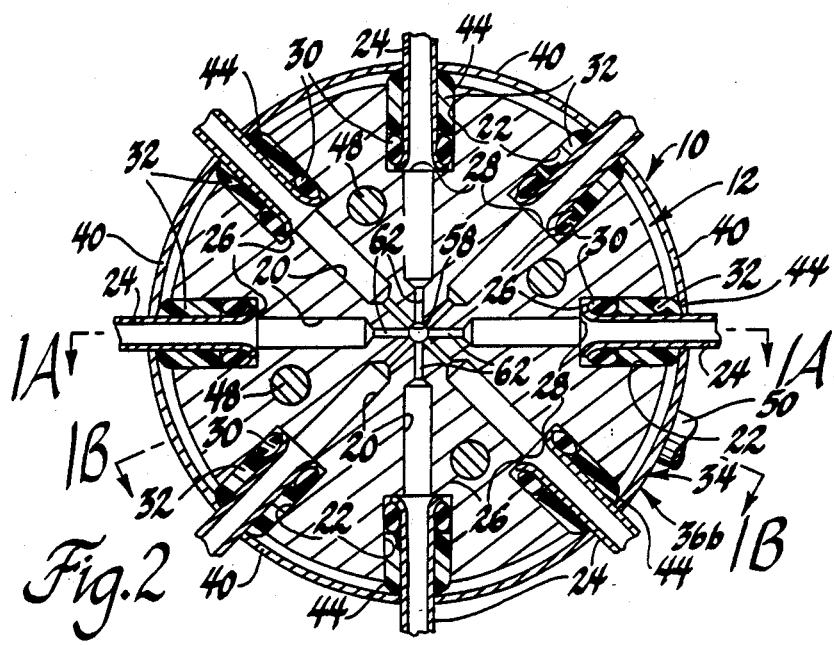
FIG. 2 is a sectional view through the lower portion of the FIG. 1 injector, taken along line 2—2 of FIG. 1, further showing the engagement of the retainer clip with the injection tube sleeves.

Referring first to FIGS. 1 and 2, a fuel injector 10 is received in a fuel body 11 and has a cylindrical base 12 that is threaded into an upper portion 14. Upper portion 14 has a cylindrical filter element 16 surrounding a fuel inlet region, and a solenoid operated valve element 17 that overlies a plurality of fuel discharge passages 18 formed in base 12. Each discharge passage 18 extends through a long radially directed feed passage 20 to a radially opening recess 22 that receives an injection tube 24.

The end 26 of each injection tube 24 is flared and received against a stepped shoulder 28 at the intersection of its recess 22 and its feed passage 20. Each injection tube 24 is surrounded by an O-ring 30 that seals the tube 24 in its recess 22. Each injection tube 24 is further surrounded by a plastic sleeve 32 that supports the tube 24 in its recess 22.

A retainer clip 34 has a base portion 36a that underlies the bottom 38 of injector base 12, and a cylindrical portion 36b divided into spring fingers 40 that embrace injection tubes 24. As retainer clip 34 is placed onto injector base 12, the curled upper end 42 of each spring finger 40 flexes outwardly to lead over the rounded ends 44 of injection tube sleeves 32. The spring fingers 40 then bias injection tube sleeves 32 to retain the ends 26 of injection tubes 24 in their recesses 22, while the rounded ends 44 of sleeves 32 assist in holding retainer clip 34 on injector base 12.

This structure thereby assures that injection tubes 24 may be readily connected to and retained by injector 10.

An air inlet adapter 46 is secured by bolts 48 to the bottom 38 of injector base 12 and also assists in holding retainer clip 34 on injector base 12. Air inlet adapter 46 has an inlet tube 50 that leads clean air to an air inlet passage 52. Inlet passage 52 opens through the bottom wall 54 of a rectifier valve chamber 56 defined between injector base 12 and adapter 46. An air outlet passage 58 opens through the top wall 60 of chamber 56 and extends to a plurality of air discharge passages 62, each opening radially into a feed passage 20.

A rectifier valve disc 64 is enclosed in chamber 56 and has a flat valving surface 66 adjacent air inlet passage 52 and an irregular surface 68 adjacent air outlet passage 58. When solenoid operated valve element 17 is opened to meter fuel through discharge passages 18, the pressure in feed passages 20 and air passages 62 and 58 increases to engage the flat valving surface 66 of rectifier valve 64 against the bottom wall 54 of chamber 56 about air inlet passage 52, thereby sealing air inlet passage 52. When solenoid operated valve element 17 is closed, the reduced pressure in feed passages 20 and air passages 62 and 58 lifts the rectifier valve 64; the irregular surface 68 of rectifier valve 64 engages the upper wall 60 about air outlet passage 58 and allow air to flow through air inlet passage 52, chamber 56, air outlet passage 58 and air discharge passages 62 to discharge feed passages 20.

Further details of the construction and operation of injector 10 are set forth in U.S. Patent Application Ser. No. 10296 mentioned above, and other such details are set forth in U.S. Pat. No. 4572436 issued Feb. 25, 1986 in the names of K. P. Cianfichi, E. R. Stettner and D. D. Stoltman. Those details will not be repeated here.

Figure 3:
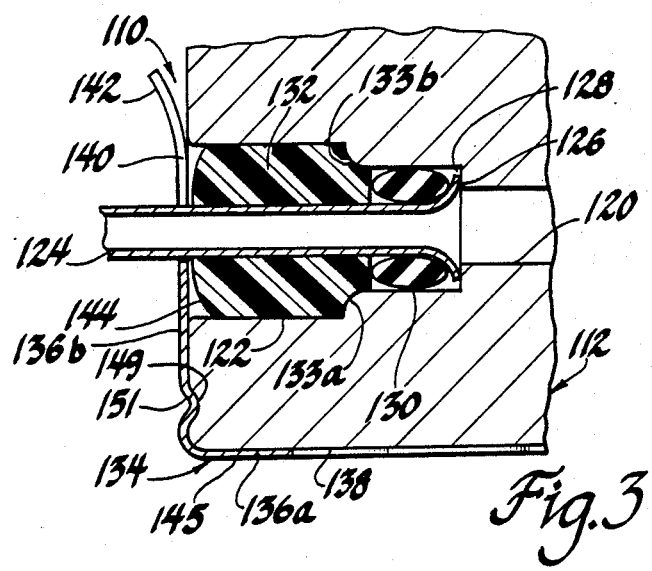
FIG. 3 is a view of a portion of a fuel injector incorporating a second embodiment of this invention and showing the engagement of the retainer clip with the injection tube sleeves.
Figure 4:
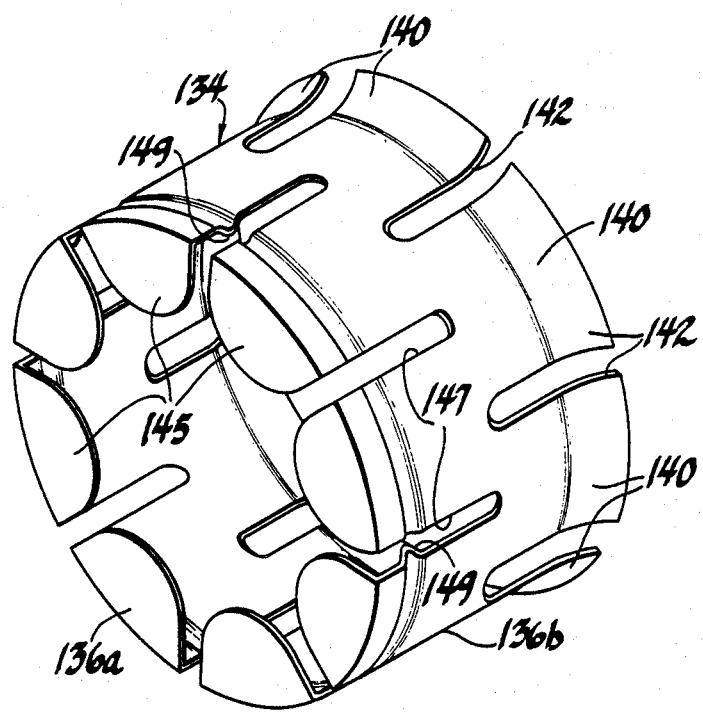
FIG. 4 is an isometric view of the clip employed in the FIG. 3 embodiment, showing the details of its construction.

Referring now to FIGS. 3 and 4, a fuel injector 110 has a cylindrical base 112 with a plurality of long radially directed feed passages 120 extending to radially opening recesses 122 that receive injection tubes 124.

The end 126 of each injection tube 124 is flared and received against a shoulder 128 at the intersection of its recess 122 and its feed passage 120, each injection tube 124 is surrounded by an O-ring 130 that seals the tube 124 in its recess 122, and each injection tube 124 is further surrounded by a plastic sleeve 132 that supports the tube 124 in its recess 122. In this embodiment, each sleeve 132 has a shoulder 133a that engages a complementary shoulder 133b in its recess 122.

A retainer clip 134 has a base portion 136a that underlies the bottom 138 of injector base 112, and a cylindrical portion 136b divided into spring fingers 140 that embrace injection tubes 124. As retainer clip 134 is placed onto injector base 112, the curled upper end 142 of each spring finger 140 flexes outwardly to lead over the rounded ends 144 of injection tube sleeves 132. The spring fingers 140 then bias injection tube sleeves 132 to retain the ends 126 of injection tubes 124 in their recesses 122.

Base portion 136a and the lower end of cylindrical portion 136b are divided into flexible tabs 145 by slits 147. Each tab 145 has an inwardly directed ridge 149 that engages in a groove 151 surrounding injector base 112, thereby securing retainer clip 134 to injector base 112. This structure thereby assures that injection tubes 124 may be readily connected to and retained by injector 110.

Injectors 10 and 110 also employ the invention set forth in patent application G-345 filed concurrently in the name of J. D. Cocca.

The embodiments of the invention in which an exclusive property or privilege is claimed are defined as follows:

1. A fuel injector having a base with plurality of radially directed feed passages that open to a plurality of radially directed recesses each receiving the end of an injection tube, the end of each tube being flared and engaging a shoulder at the intersection of its recess and its feed passage, an O-ring surrounding each tube and sealing the tube in its recess, a sleeve surrounding each tube and supporting the tube in its recess, and a retainer clip secured to the base, said clip including flexible spring fingers that embrace the tubes and bias the sleeves to retain the ends of the tubes in their recesses, the ends of the spring fingers being curled to lead over the ends of the sleeves, and the ends of the sleeves being rounded to assist in holding the clip on the base.

2. A fuel injector having a plurality of radially directed recesses each receiving the end of an injection tube, wherein the end of each tube is flared, an O-ring surrounds each tube to seal the tube in its recess, a sleeve surrounds each tube to support the tube in its recess, and a single retainer clip is secured to the injector base and has spring fingers that embrace each of the tubes and bias each of the sleeves to retain the ends of each of the tubes in their radially directed recesses in the injector.

3. A fuel injector having a plurality of radially directed feed passages that open to a plurality of radially directed recesses each receiving the end of an injector tube, wherein the end of each tube is flared and engages a shoulder at the intersection of its recess and its feed passage, an O-ring surrounds each tube to seal the tube in its recess, a sleeve surrounds each tube to support the tube in its recess, and a single retainer clip is secured to the injector base and has spring fingers that embrace each of the tubes and bias each of the sleeves to retain the ends of each of the tubes in their recesses in the injector.

* * * * *